(12) United States Patent
Pietrantoni

(10) Patent No.: US 6,913,016 B2
(45) Date of Patent: Jul. 5, 2005

(54) VALVE MANIFOLD ASSEMBLY

(75) Inventor: Dennis P. Pietrantoni, Lancaster, NY (US)

(73) Assignee: AVOX Systems, Inc., Lancaster, NY (US)

( * ) Notice: Subject to any disclaimer, the term of this patent is extended or adjusted under 35 U.S.C. 154(b) by 0 days.

(21) Appl. No.: 10/337,146

(22) Filed: Jan. 6, 2003

(65) Prior Publication Data

US 2003/0131850 A1 Jul. 17, 2003

Related U.S. Application Data

(60) Provisional application No. 60/346,397, filed on Jan. 7, 2002.

(51) Int. Cl.[7] .............................................. A61M 16/00
(52) U.S. Cl. .............................. 128/204.29; 128/205.24
(58) Field of Search ........................ 128/204.18, 204.29, 128/205.24, 205.25, 205.21, 206.21, 207.12, 206.27; 244/118.5, 129.1, 129.4; 137/535, 613, 907, 908

(56) References Cited

U.S. PATENT DOCUMENTS

| | | | | |
|---|---|---|---|---|
| 3,073,301 A | * | 1/1963 | Hay et al. ............... | 128/205.24 |
| 3,503,394 A | | 3/1970 | Hotz et al. | |
| 4,481,945 A | | 11/1984 | Levine | |
| 4,510,930 A | * | 4/1985 | Garcia ................... | 128/202.22 |
| 4,549,870 A | * | 10/1985 | Wass ............................ | 441/41 |
| 4,619,255 A | | 10/1986 | Spinosa et al. | |
| 4,802,472 A | * | 2/1989 | Jung ...................... | 128/204.18 |
| 4,909,247 A | | 3/1990 | Terrisse et al. | |
| 4,996,982 A | * | 3/1991 | Williamson ............ | 128/205.24 |
| 5,078,343 A | * | 1/1992 | Howlett ................... | 244/118.5 |
| 5,165,625 A | | 11/1992 | Gutman | |
| 5,301,665 A | * | 4/1994 | Jumpertz et al. ....... | 128/202.26 |
| 5,335,696 A | | 8/1994 | McKenzie | |
| 5,429,125 A | * | 7/1995 | Wagner et al. ......... | 128/205.25 |
| 5,954,052 A | * | 9/1999 | McDonald et al. .... | 128/206.27 |
| 5,971,025 A | | 10/1999 | Backlund | |
| 6,155,258 A | * | 12/2000 | Voege .................... | 128/205.21 |
| 6,247,471 B1 | * | 6/2001 | Bower et al. .......... | 128/205.21 |
| 6,497,386 B2 | * | 12/2002 | Martinez ................. | 244/118.5 |
| 6,497,387 B2 | * | 12/2002 | Martinez ................. | 244/118.5 |

* cited by examiner

*Primary Examiner*—Henry Bennett
*Assistant Examiner*—Teena Mitchell
(74) *Attorney, Agent, or Firm*—Hodgson Russ LLP

(57) ABSTRACT

A valve manifold assembly having a valve body with at least one chamber defined therein. The chamber has at least one inlet and at least one outlet and has at least one opening. A poppet is disposed in the chamber. The poppet slides in the chamber between a first position where the poppet seals the inlet and a second position where the poppet is disposed in spaced-apart relation relative to the inlet. The poppet has an opening disposed therein. A pin having a first section with a first diameter and having a second section with a second diameter is capable of being slidably disposed through the at least one opening in the valve body and through the opening in the poppet.

22 Claims, 4 Drawing Sheets

VALVE MANIFOLD ASSEMBLY

CROSS-REFERENCE TO RELATED APPLICATION

Applicant hereby claims priority based on U.S. Provisional Patent Application No. 60/346,397 filed Jan. 7, 2002, entitled "Valve Manifold Assembly" which is incorporated herein by reference.

FIELD OF THE INVENTION

The invention relates to an assembly for deploying an emergency breathing mask in an aircraft.

BACKGROUND OF THE INVENTION

Many aircraft are required to provide passengers and crew members in the pressurized cabin with an emergency breathing mask in the event of a sudden loss of cabin pressure due to a rupture in the cabin wall or to a failure in the aircraft's pressurizing system. The conventional emergency breathing mask is typically stowed in an overhead storage container directly over the user. Upon a sudden loss of cabin pressure, the container door automatically opens and the mask is deployed by gravity to the user. The mask typically hangs from the open container in the vicinity of the user, but the flow of breathing gas to the mask is not automatically activated. Because the mask may drop over an empty seat, it is desirable to have a user-activated valve that controls the flow of breathing gas to the mask. It has been known to provide a lanyard that is connected between the breathing gas conduit or the mask and a valve in the container such that when the mask is pulled toward the face of the user, the tension on the lanyard opens a valve to allow breathing gas to flow to the mask. An example is disclosed in U.S. Pat. No. 4,909,247 which is incorporated herein by reference.

What is needed is an improved valve manifold assembly.

SUMMARY OF THE INVENTION

The present invention meets the above need by providing a valve manifold assembly having a valve body with at least one chamber defined therein. The chamber has at least one inlet and at least one outlet and has at least one opening. A poppet is disposed in the chamber. The poppet slides in the chamber between a first position where the poppet seals the inlet and a second position where the poppet is disposed in spaced-apart relation relative to the inlet. The poppet has a bore disposed therethrough. A pin is capable of being slidably disposed through the at least one opening in the valve body and through the bore in the poppet. The pin may take different shapes to avoid unintentional actuation of the valve due to environmental conditions such as shock or vibration. In a first embodiment, the pin has at least two concentric sections having different diameters. In a second embodiment, the pin is elongated such that it is prevented from exiting the poppet due to the position of the door when the door is in the closed position.

BRIEF DESCRIPTION OF THE DRAWINGS

The invention is illustrated in the drawings in which like reference characters designate the same or similar parts throughout the figures of which.

DETAILED DESCRIPTION

Figure 1:
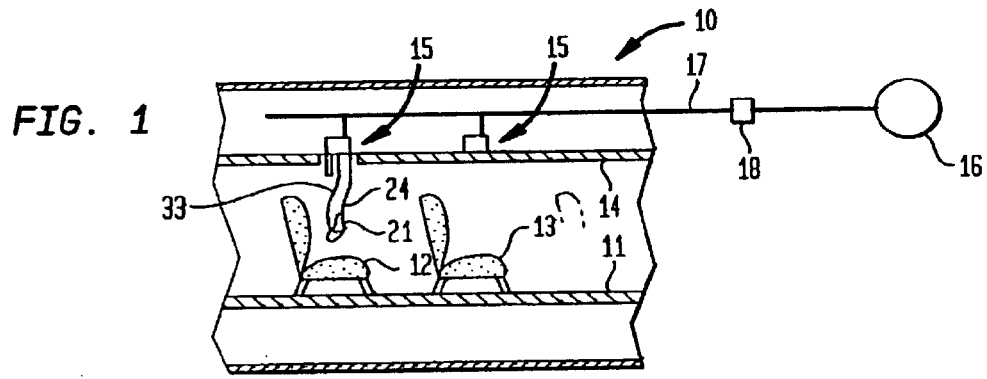
FIG. 1 is a fragmentary longitudinal schematic view of the interior of an airplane showing one environment in which the invention is operative.

In an embodiment of the invention chosen for the purpose of illustration there is shown by way of example a fragment of aircraft frame 10 having a floor 11 on which are rows of seats 12 and 13. A ceiling panel 14 has mounted in it over each respective row of seats an oxygen mask dispensing container indicated generally by the reference character 15, all of which are supplied from a common oxygen source 16 through an oxygen line 17 having a pressure control valve 18. By way of example, the passenger mask unit on the left is shown in released position and that on the right in closed position. Each mask 21 is provided with a conduit 24 for oxygen attached to a valve manifold assembly 30 (FIGS. 3–5) and a lanyard 33.

Figure 2:
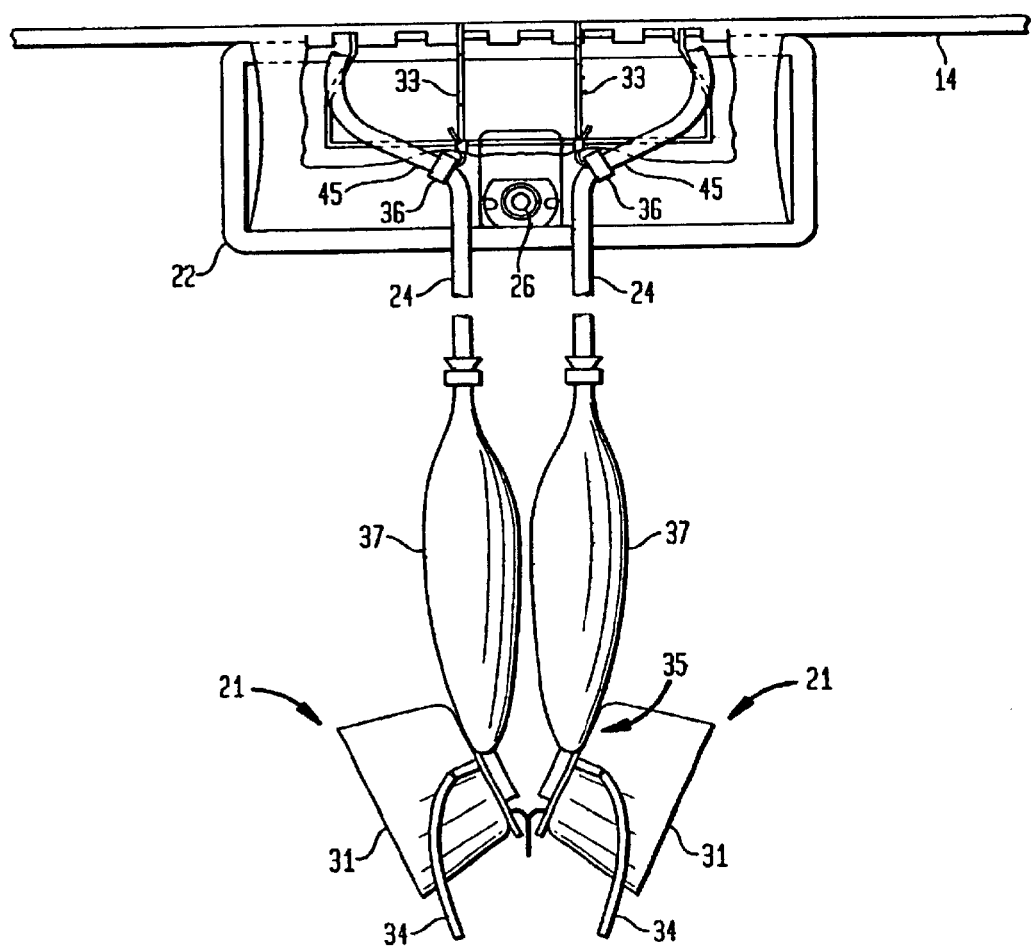
FIG. 2 is a partial front elevational view of an aircraft passenger oxygen system in the deployed position.
Figure 6:
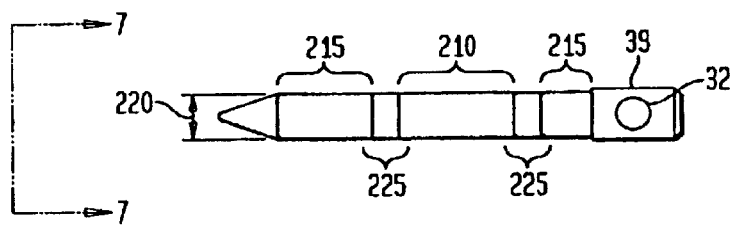
FIG. 6 is a side elevational view of the pin of the present invention.

Turning to FIG. 2, as an example two masks 21 are shown in the deployed position. The number of masks 21 may be varied as will become obvious to those of ordinary skill in the art. As shown a door 22 opens from ceiling panel 14 to deploy the masks 21. As described in greater detail hereinafter, the door 22 may be automatically opened by means of a spring-biased piston 23 (FIG. 4) engaging with a latch 26 on the inside surface of the door 22. The masks 21 are shown in a fully downwardly deployed position within reach of the user. When the door 22 is opened as shown in FIG. 2, the free fall of the masks 21 is stopped by lanyards 33 which connect between the conduit 24 at 36 and control pins 39 (FIG. 4) on valve manifold assembly 30. The lanyards 33 may be attached at one end to the conduit 24 as shown or they can be attached at other points on the conduit 24 or mask 21. The lanyards 33 can be attached at any point on the conduit 24 or mask 21 that provides significant motion when the mask 21 is drawn to the face of the user during deployment. The lanyards 33 are connected to pins 39 by eyelets 42 (FIG. 4) that are attached to the pin 39 through opening 32 (FIG. 6). Lanyards 33 thus support masks 21 within reach of intended users and in this position hang taut under the weight of the masks 21 while conduits 24 remain slack as illustrated at 45 in FIG. 2. Traction on lanyard 33, as by positive action of an individual user pulling downward on one of the masks 21, withdraws pin 39 from valve manifold assembly 30 to actuate the supply of breathing gas to that mask 21. In the illustrated form, each mask 21 is of the modified phase dilution type comprising a truncated hollow cone 31 of suitable material, such as an elastomer, open through its larger end which is adapted to be held against the face of a user and kept in place by an elastic band 34. The smaller end 35 of each mask 21 is connected to a reservoir bag 37 which is connected to conduit 24 whereby breathing fluid is provided through conduit 24 into the bag to accumulate flow when the user is not inhaling. Attached at the smaller end 35 of the mask 21 are three flapper valves (not shown). One flapper valve is spring loaded to be a phase dilution valve which allows a predetermined amount of outside air into the mask 21 to mix with the breathing fluid supplied to the user so that each user will receive a metered amount of fluid. Another flapper valve is an exhalation valve assembly through which the exhaled carbon dioxide from the user is dispensed to the surrounding atmosphere. The third flapper valve permits fluid flow from the reservoir bag 37 to mask 21 and closes to prevent reverse flow. Such mask arrangements are known in the art, and are not per se, a part of this invention. Other face masks 21, including masks equipped with demand regulators can be utilized in the present invention.

Figure 3:
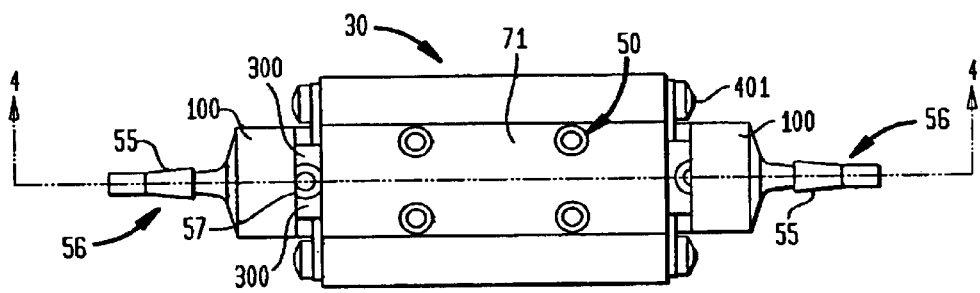
FIG. 3 is a top view of the valve manifold assembly of the present invention.

Turning to FIG. 3, the valve manifold assembly 30 has a set of openings 50 disposed in the top of the assembly 30. The openings 50 may be threaded to engage with a set of fasteners 52 (shown in FIG. 4) that attach the assembly 30 to the oxygen mask dispensing container 15. Hose connectors 56 extend from opposite sides of the assembly 30. The connectors 56 shown are in the form of hose barbs 55 for connection to the conduits 24 that carry the breathing gas to the masks 21. Other types and shapes of hose connectors would also be suitable. For example, as will be evident to those of ordinary skill in the art, additional hose connectors 56 may be connected to the flow actuation valve 60 so that a single flow actuation valve can distribute breathing gas to a plurality of masks 21 through a plurality of conduits 24. As will also be evident to those of ordinary skill in the art, if multiple masks 21 are supplied through a single flow actuation valve then the respective lanyards 33 would each be connected to a single pin 39. Accordingly, the present invention may function with a flow actuation valve for every mask or may function with multiple masks connected to a single flow actuation valve. When multiple masks 21 are connected to a single flow actuation valve, breathing gas may be allowed to flow to a mask deployed over an empty seat.

As will be described in greater detail hereinafter, the valve manifold assembly 30 is formed by attaching valve housings 100 to opposite sides of valve body 71 by means of screws 401. The valve housing 100 has a slot 300 that allows for rotation of the pin 39 in unison with the poppet 70. The opening 57 in the poppet 70 that receives the pin 39 visible through the slot 300.

Figure 4:
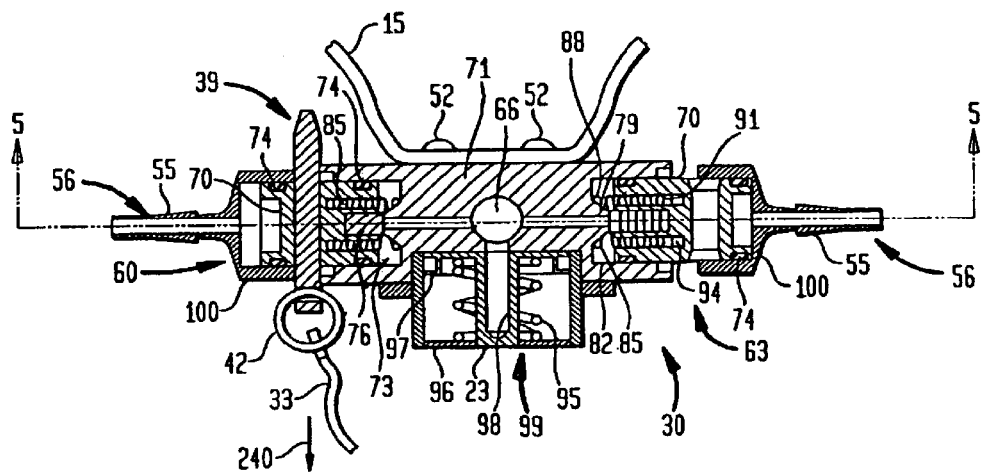
FIG. 4 is a cross-sectional view taken along lines 4—4 of FIG. 3.

In FIG. 4, the lanyards 33 are connected to pins 39 by eyelets 42. On the left hand side of the figure, a first flow actuation valve 60 is shown in the closed position. On the right hand side of the figure a second flow actuation valve 63 (which is identical to the first flow actuation valve 60) is shown in the open position where the pin 39 has been removed by the user pulled lanyard 33. A pair of ports 66 (best shown in FIG. 5) provide for pressurizing the manifold from the breathing gas source. Two ports 66 are provided in the manifold, therefore numerous manifold assemblies 30 can be connected in series so that outlets 56 are in parallel to accommodate specific applications. Multiple assemblies 30 may be connected in series or a single assembly 30 may be constructed with additional flow actuation valves. One manifold port 66 can be plugged while the other is supplied with gas under pressure.

The flow actuation valve 60 is comprised of a precision machined poppet 70 that may be constructed out of suitable materials such as aluminum. The poppet 70 moves back and forth inside a chamber 73 disposed inside the valve body 71. A set of O-rings 74 seals the sides of the poppet 70 inside the chamber 73 so that breathing gas cannot flow around the sides of the poppet 70. At one end of the poppet 70, a soft elastomer seat 76 is inserted into a bore in the poppet 70 and retained in place with an adhesive. The bore is deep enough to provide a sufficient amount of space for the elastomer as described hereafter. The soft elastomer may comprise a silicone meeting or exceeding MIL ZZ-R-765 Type IIA or IIB Grade 70. The adhesive may comprise a cyanoacrylate, silicone, or other suitable adhesive. A hard seat 79 is formed around a centrally disposed opening 82 in the valve body 71.

A coil spring 85 has a first end 88 and a second end 91. The first end 88 engages with the valve body 71 around the opening 82. The second end 91 is disposed opposite the first end 88 and rests inside an opening 94 in the poppet 70. Depending on the spring rate, the spring 85 could also be disposed external to the poppet 70. The spring 85 may be formed out of stainless steel. The spring 85 biases the poppet in the open position shown on the right hand side of FIG. 4.

In order to assemble the flow actuation valve 60, 63, the valve spring 85 is inserted into the chamber 73 formed in the valve body 71 such that the poppet 70 acts to compress the spring 85 as it is inserted. The portion of the poppet 70 extending beyond the valve body 71 is inserted into the valve housing 100. The valve housing 100 is secured to the valve body 71 using screws 401 (FIG. 5) to form the valve manifold assembly 30.

Upon inserting the pin 39 through the poppet 70, the poppet 70 and the soft seat 76 are forced toward the hard seat 79 while compressing the valve spring 85. At full insertion of the pin 39, the compression forces the soft seat 76 to conform to the hard seat 79 thereby providing a seal. Also, when the pin 39 is inserted into the poppet 70 as shown in the left hand side of FIG. 4, force is exerted by the spring 85 onto the pin 39 through the poppet 70 causing it to rest against the valve housing 100.

In the middle of FIG. 4, a spring-biased piston 23 is shown. The spring 95 may be a coil spring disposed around the piston 23 and biased in the closed position as shown in FIG. 4. The piston 23 is held inside a housing 96 that attaches to the assembly 30. The piston 23 has a set of O-rings 97 for sealing the piston inside the housing 96. The inside of piston 23 is hollow such that a pressurized breathing gas from port 66 acts against the inside surface 98 of the piston 23 to move the piston 23 downward, with respect to the orientation of FIG. 4, against the force of spring 95. When actuated by pressure, the piston 23 extends out of the opening 99 in the housing 96 and engages with the door latch 26 to release the door 22 as shown in FIG. 2.

Figure 5:
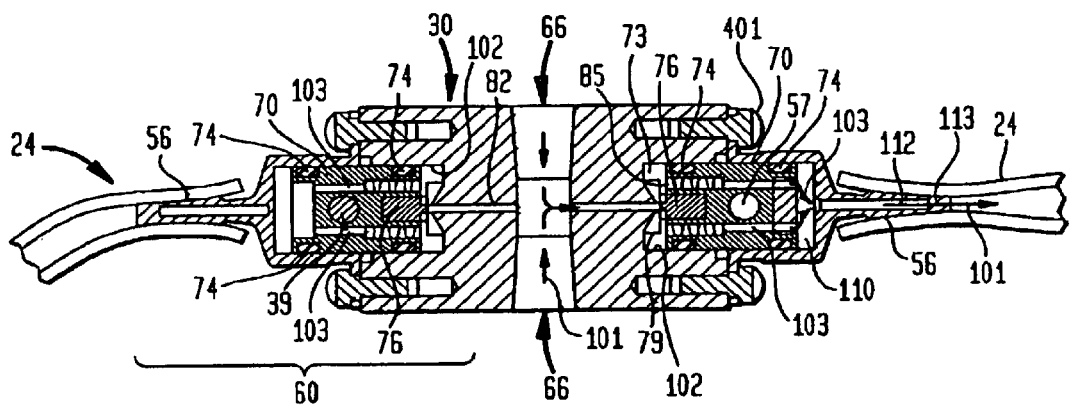
FIG. 5 is a cross-sectional view taken along lines 5—5 of FIG. 4.

Turning to FIG. 5, the arrows 101 indicate the flow path of the breathing gas through the right hand side of the figure. The removal of the pin 39 results in the poppet 70 moving to the right with respect to the orientation of the figure. The force of the spring 85 (and supplemented by the gas pressure) causes this movement of the poppet 70. As a result of this motion, the soft seat 76 on the poppet 70 moves away from the central opening 82 in the valve body 71. Accordingly, referring to the right hand side of the figure, the breathing gas from the one or more open ports 66 is allowed to pass through the central opening 82 and into the chamber 73 formed between the left side of the poppet 70 and the inside walls 102 of the valve body 71. Because the poppet 70 has O-rings 74 installed around its perimeter, the breathing gas cannot escape between the inside walls 102 of the valve body 71 and the poppet 70. A pair of pathways 103 disposed through the poppet 70 provide for egress of the pressurized gases. As shown, there are two channels disposed through the poppet 70. Each channel has a first open end on the left side of the poppet 70 and has a second open end at the right hand side of the poppet 70. The second opening allows breathing gas under pressure to pass through the poppet 70 into the chamber 110 formed between the poppet 70 and the valve housing 100. The valve housing 100 also has a central opening 112 that extends through the hose connector 56. The breathing conduit 24 that leads to the mask 21 is attached to the hose connector 56 and carries the breathing gas to the mask 21 as shown in FIG. 2. Returning to FIG. 5, a calibrated orifice 113 is fabricated in the hose barb area of the connector 56 of the valve housing 100, so that a predetermined flow of oxygen is administered to the oxygen mask 21 at a given supply pressure.

Figure 7:
FIG. 7 is an end view taken along lines 7—7 of FIG. 6.

In FIGS. 6 and 7, the pin 39 is shown in greater detail. The pin 39 has two sections with different but concentric diameters. The first diameter 200 which is the larger of the two diameters is located along a midportion 210 of the pin 39, while the second diameter 220 which is the smaller of the two diameters extends along end portions 215 disposed on opposite sides of the mid portion 210. A transition zone 225 of varying diameter is located at both locations where the pin 39 changes diameters. When the pin 39 is fully inserted, the section having the first diameter 200 is acted on by the compressed valve spring 85 through the poppet 70, thereby causing the section with the smaller pin diameter 220 to rest against the opening in the valve housing 100. When the pin 39 is removed in the direction indicated by arrow 240 in FIG. 4 and with reference to the opening in the valve housing 100 located closer to the eyelet 42, the section with the smaller diameter 220 passes against the valve housing 100 until the first transition zone 225 of varying diameter comes in contact with the valve housing 100. As the transition zone 225 of the pin 39 passes through the opening in the valve housing 100, the valve spring 85 is further compressed through the force of the pin 39 on the poppet 70. The valve spring 85 compression continues until it reaches the maximum that is defined as one-half of the diametrical difference between the two diameters 200, 220 of the pin 39. This additional compression of the valve spring 85 increases the amount of force required to remove the pin 39. The additional force required to remove the pin 39 is provided to prevent pin 39 from being inadvertently removed due to environmental conditions such as shock and vibration. The soft seat 79 material must be sufficiently resilient to maintain a seal at both levels of compression forces corresponding to the different diameters 200, 220 and to do so without resulting in compression set. The depth of the bore may be increased in order to provide for a greater amount of the elastomer to be utilized in order to prevent compression set.

Figure 8:
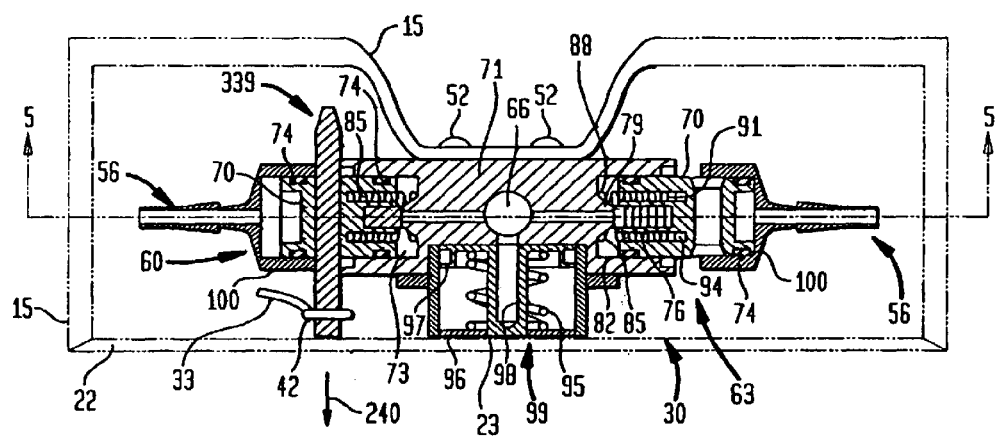
FIG. 8 is a sectional view of an alternate embodiment of the present invention.

In FIG. 8, an alternate embodiment of the invention includes a pin 339 having a constant diameter throughout a majority of its length. The pin 339 is elongated such that inadvertent removal of the pin 339 from the poppet 70 is prevented because the pin 339 extends downward far enough toward the door 22 such that the pin 339 is obstructed by the door 22 when the door 22 is in its closed position. When the door 22 opens as shown in FIG. 2, the masks 21 drop down and the pin 339 can be removed from the poppet 70 via the user pulled lanyard 33 as described previously.

Returning to FIG. 4, the pin 39 extends through the poppet 70 and completely through the valve assembly 30. As will be evident to those of ordinary skill in the art, the poppet 70 may be provided with a recess for receiving a pin that does not extend all the way through the valve assembly 30. Also, it will be evident to those of ordinary skill in the art that the movable member does not have to be solid and could be hollow.

While the invention has been described in connection with certain embodiments related to a passenger oxygen system for aircraft, it is not intended to limit the scope of the invention to the particular forms set forth, but, on the contrary, it is intended to cover such alternatives, modifications, and equivalents as may be included within the spirit and scope of the invention. In particular, the valve manifold assembly 30 of the present invention may be useful in other shutoff or gas valve applications. Accordingly, the invention is not to be limited to the particular application to a passenger oxygen delivery system in an aircraft. Other applications of the device to shut off valves will be known to those of ordinary skill in the art.

What is claimed is:

1. A valve manifold assembly, comprising:
   a valve body having at least one chamber defined therein, the chamber having at least one inlet and at least one outlet, the valve body having a first opening and a second opening;
   a poppet disposed in the chamber, the poppet slidably disposed in the chamber between a first position where the poppet seals the inlet and a second position where the poppet is disposed in spaced apart relation relative to the inlet, the poppet having at least one opening disposed therein; and,
   a pin capable of being slidably disposed through the first opening in the valve body, the at least one opening in the poppet and through the second opening in the valve body.

2. A valve manifold assembly, comprising:
   a valve body having at least one chamber defined therein, the chamber having at least one inlet and at least one outlet and having at least one opening;
   a poppet disposed in the chamber, the poppet slidably disposed in the amber between a first position where the poppet seals the inlet and a second position where the poppet is disposed in spaced apart relation relative to the inlet, the poppet having an opening disposed therein; and,
   a pin capable of being slidably disposed through the at least one opening in the valve body and through the at least one opening in the poppet, wherein the pin has a first section with a first diameter and having a second section with a second diameter.

3. The valve manifold assembly of claim 2, wherein the first section on the pin is disposed along a midportion.

4. The valve manifold assembly of claim 2, wherein the second section of the pin is disposed on opposite sides of the first section.

5. The valve manifold assembly of claim 2, wherein the first is larger than the second diameter.

6. The valve manifold assembly of claim 2, further comprising a transition zone disposed between the first and second section.

7. The valve manifold assembly of claim 6, wherein the transition zone has a gradually varying diameter.

8. A valve manifold assembly, comprising:
   a valve body having at least one chamber defined therein, the chamber having at least one inlet and at least one outlet and having at least one opening;
   a poppet disposed in the chamber, the poppet slidably disposed in the chamber between a first position where the poppet seals the inlet and a second position where the poppet is disposed in spaced apart relation relative to the inlet, the poppet having an opening disposed therein; and,
   a pin capable of being slidably disposed through the at least one opening in the valve body and through the at least one opening in the poppet, wherein the at least one opening in the valve body further comprises a first an second opening in the valve body formed in the shape of a slot such that the poppet and pin are capable of rotating relative to the valve body.

9. A valve manifold assembly, comprising:
   a valve body having at least one chamber defined therein, the chamber having at least one inlet and at least one outlet and having a first opening and a second opening;
   a poppet disposed in the chamber, the poppet slidably disposed in the chamber between a first position where the poppet seals the inlet and a second position where the poppet is disposed in spaced apart relation relative to the inlet, the poppet having at least one opening disposed therein; and, a pin capable of being slidably disposed through the first opening in the valve body, through the at least one opening in the poppet, and through the second opening in the valve body, wherein the pin is attached to at least one lanyard disposed on at least one oxygen mask assembly.

10. A valve manifold assembly, comprising:

a valve body having at least one chamber defined therein, the chamber having at least one inlet and at least one outlet, the valve body having a first opening and a second opening;

a poppet disposed in the chamber, the poppet slidably disposed in the chamber between a first position where the poppet seals the inlet and a second position where the poppet is disposed in spaced apart relation relative to the inlet, the poppet having at least one opening disposed therein; and, a pin capable of being slidably disposed through the first opening in the valve body, through the at least one opening in the poppet, and through the second opening in the valve body, wherein, the poppet is biased in the open position.

11. A valve manifold assembly for an oxygen mask dispensing container, the valve manifold assembly, comprising:

a valve body having at least one chamber defined therein, the chamber having at least one inlet and at least one outlet, the valve body having a first opening and a second opening;

a poppet disposed in the chamber, the poppet slidably disposed in the chamber between a first position where the poppet seals the inlet and a second position where the poppet is disposed in spaced apart relation to the inlet, the poppet having at least one opening disposed therein;

a pin capable of being slidably disposed through the first opening in the valve body, through the opening in the poppet and through the second opening in the valve body;

at least one lanyard attached to the pin at a first end and having a second end disposed opposite the first end; and, at least one oxygen mask assembly connected to the second end of the at least one lanyard and disposed in fluid communication with the outlet of the chamber.

12. The valve manifold assembly of claim 11, wherein the at least one lanyard is attached to a conduit that leads to the at least one oxygen mask assembly.

13. The valve manifold assembly of claim 11, wherein the poppet is biased in the open position.

14. The valve manifold assembly of claim 13, wherein the poppet is biased by a coil spring.

15. A valve manifold assembly for an oxygen mask container, the valve manifold assembly, comprising:

a valve body having at least one chamber defined therein, the having at least one inlet and at least one outlet and having at least one opening;

a poppet disposed in the chamber, the poppet slidably disposed in the chamber between a first position where the poppet seals the inlet and a second position where the poppet is disposed in spaced apart relation to the inlet, the poppet having an opening disposed therein;

a pin capable of being slidably disposed through the at least one opening in the valve body and through the opening in the poppet;

at least one lanyard attached to the pin at a first end and having a second end disposed opposite the first end; and, at least one oxygen mask assembly connected to the second end of the at least one lanyard and disposed in fluid communication with the outlet of the chamber, wherein the pin has a first section with a first diameter and having a second section with a second diameter.

16. The valve manifold assembly of claim 15, wherein the first section on the pin is disposed along a midportion.

17. The valve manifold assembly of claim 15, wherein the second section of the pin is disposed on opposite sides of the first section.

18. The valve manifold assembly of claim 15, wherein the first diameter is larger than the second diameter.

19. The valve manifold assembly of claim 15, further comprising a transition zone disposed between the first and second section.

20. The valve manifold assembly of claim 19, wherein the transition zone has a gradually varying diameter.

21. A valve manifold assembly for an oxygen mask dispensing container, the valve manifold assembly, comprising:

a valve body having at least one chamber defined therein, the chamber having at least one inlet and at least one outlet and having at least one opening;

a poppet disposed in the chamber, the poppet slidably disposed in the chamber between a first position where the poppet seals the inlet and a second position where the poppet is disposed in spaced apart relation to the inlet, the poppet having an opening disposed therein;

a pin capable of being slidably disposed through the at least one opening in the valve body and through the opening in the poppet;

at least one lanyard attached to the pin at a first end and having a second end disposed opposite the first end; and, at least one oxygen mask assembly connected to the second end of the at least one lanyard and disposed in fluid communication with the outlet of the chamber, wherein the at least one opening in the valve body further comprises a first and second opening in the valve body formed in the shape of a slot such that the poppet and pin are capable of rotating relative to the valve body.

22. A valve manifold assembly for an oxygen mask dispensing container, the valve manifold assembly, comprising:

a valve body having at least one chamber defined therein, the chamber having at least one inlet and at least one outlet, the valve body having a first opening and a second opening;

a poppet disposed in the chamber, the poppet slidably disposed in the chamber between a first position where the poppet seals the inlet and a second position where the poppet is disposed in spaced apart relation to the inlet, the poppet having at least one opening disposed therein;

a door capable of opening automatically in response to the flow of breathing gas into the valve body; and, a pin capable of being slidably disposed through the first opening in the valve body, the at least one opening in the poppet, and through the second opening in the valve body, the pin having at least one end disposed adjacent to the door, such that when the door is in a closed position the door obstructs movement of the pin.

* * * * *

UNITED STATES PATENT AND TRADEMARK OFFICE
CERTIFICATE OF CORRECTION

PATENT NO. : 6,913,016 B2
DATED : July 5, 2005
INVENTOR(S) : Dennis P. Pietrantoni It is certified that error appears in the above-identified patent and that said Letters Patent is hereby corrected as shown below:

Column 6,
Line 18, "amber" should read -- chamber --; and

Column 7,
Line 55, "the having" should read -- the chamber having --.

Signed and Sealed this

Eleventh Day of October, 2005

JON W. DUDAS
*Director of the United States Patent and Trademark Office*